S. C. Norcross,
Auger Handle.
No. 39,669. Patented Aug 25, 1863.
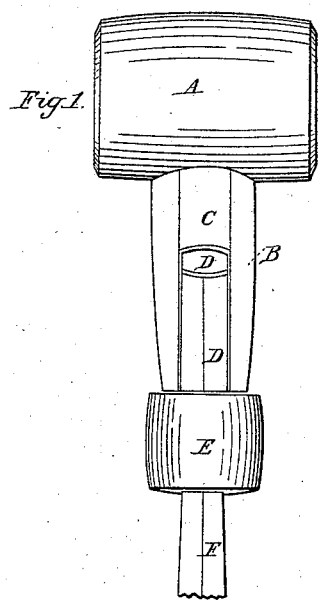
Fig. 1.
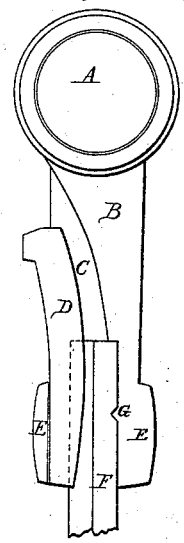
Fig. 2.
Fig. 4.
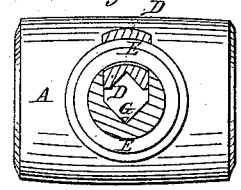
Fig. 3.
Fig. 5.

UNITED STATES PATENT OFFICE.

SAMUEL C. NORCROSS, OF NORWAY, MAINE.

IMPROVED AUGER-STOCK.

Specification forming part of Letters Patent No. 39,669, dated August 25, 1863.

*To all whom it may concern:*

Be it known that I, SAMUEL C. NORCROSS, of Norway, in the county of Oxford and State of Maine, have invented a new, useful, and Improved Auger-Stock; and I do hereby declare the same to be fully described in the following specification and represented in the accompanying drawings, of which—

Figure 1 is a side elevation. Fig. 2 is a vertical section showing the small projection G for securing the shank of the auger. Fig. 3 is an end view, which shows the oblique position of the socket, also the small projection G, also the end of the key. Fig. 4 is a vertical section of the key, showing the groove or hollow H upon the inside of the key. Fig. 5 is a transverse section of the small end of the key, showing the position of the groove H in the side of key.

The object I had in view in making my invention was to supply a want which has long existed—viz., an auger handle or stock so arranged that a person could take out an auger of one size and place in the socket one of another size easily and quickly and in a secure manner.

The nature of my invention consists in an improved auger-stock so constructed that an auger of one size may be exchanged for one of another size very quickly by simply knocking out the key D and replacing the same after inserting the shank of the auger of the required size.

In the drawings, B is the stock or body, having an aperture or opening, A, on its upper end, into which is inserted the handle when ready for use. E is a continuation of the body B, having a ferrule on its lower end, which surrounds the key D at its lower end, as represented in Fig. 2. F is the shank of the auger as it will be when inserted or placed in the socket. C is a groove in the body B to allow the key D to be inserted inside the ring or ferrule E. D in Figs. 1 and 2 shows the key in the position it will be in when the auger is in and it is ready to work. The socket is shown at I in Fig. 3, also the oblique position of the sides of the socket in relation to the aperture or part of the body A, also the manner in which the key D rests upon the shank F, also the projection G on the opposite side of the socket, so that when the key is in its place it presses the notch G in the shank F down upon the projection G, which secures it and prevents the auger from being drawn out of the socket in working.

An auger-stock constructed in the above-described improved manner can be readily adapted to augers of any size by simply fitting the shank of the augers to the socket and filing a notch to receive the projection G, and confining it by bringing the key D to its proper position.

Having described my invention, I claim—

My improved auger-stock, having its aperture for the handle A, its body B, its groove C, and ferrule or ring E, its key D, and its projection and notch or hollow G, its oblique socket I, constructed and arranged in relation to each other, and so as to operate together as set forth.

SAMUEL C. NORCROSS.

Witnesses:
LEVI WHITMAN,
GEORGE FRANKLIN EVANS.